(12) United States Patent
Ortiz

(10) Patent No.: US 8,193,653 B2
(45) Date of Patent: Jun. 5, 2012

(54) AUTOMATIC PITCH TURBINE

(75) Inventor: Israel Ortiz, Guayama, PR (US)

(73) Assignee: Israel Ortiz, Guayama, PR (US)

( * ) Notice: Subject to any disclaimer, the term of this patent is extended or adjusted under 35 U.S.C. 154(b) by 281 days.

(21) Appl. No.: 12/800,035

(22) Filed: May 7, 2010

(65) Prior Publication Data

US 2011/0272945 A1 Nov. 10, 2011

(51) Int. Cl.
*F03B 13/10* (2006.01)
(52) U.S. Cl. .......................... 290/43; 290/42
(58) Field of Classification Search .............. 290/42, 290/43, 53, 54; 60/398; 415/3.1
See application file for complete search history.

(56) References Cited

U.S. PATENT DOCUMENTS

| | | | |
|---|---|---|---|
| 7,218,011 B2 * | 5/2007 | Hiel et al. | 290/43 |
| 7,352,074 B1 * | 4/2008 | Pas | 290/43 |
| 7,471,009 B2 * | 12/2008 | Davis et al. | 290/54 |
| 8,115,329 B2 * | 2/2012 | Thompson | 290/43 |
| 2008/0290663 A1 * | 11/2008 | Shifrin | 290/52 |
| 2009/0021011 A1 * | 1/2009 | Shifrin et al. | 290/43 |

* cited by examiner

*Primary Examiner* — Tho D Ta

(57) ABSTRACT

A turbine that will produce useful mechanical force from the dynamic force of the sea wave. This is done by rectifying the bidirectional force obtained from such wave. This turbine will produce a unidirectional rotation from the bidirectional force of the wave. The turbine will adjust the pitch of its blades automatically as the air flow inside the pipe changes direction, The air flow will change the pitch of the blade, because the blade is mounted on a shaft through ball bearings. Because the blade is acting like a flag on a pole that has a long tail and also the blade has a long tail and will always change its direction in accord to the direction of the air flow.

1 Claim, 9 Drawing Sheets

FIGURE 2
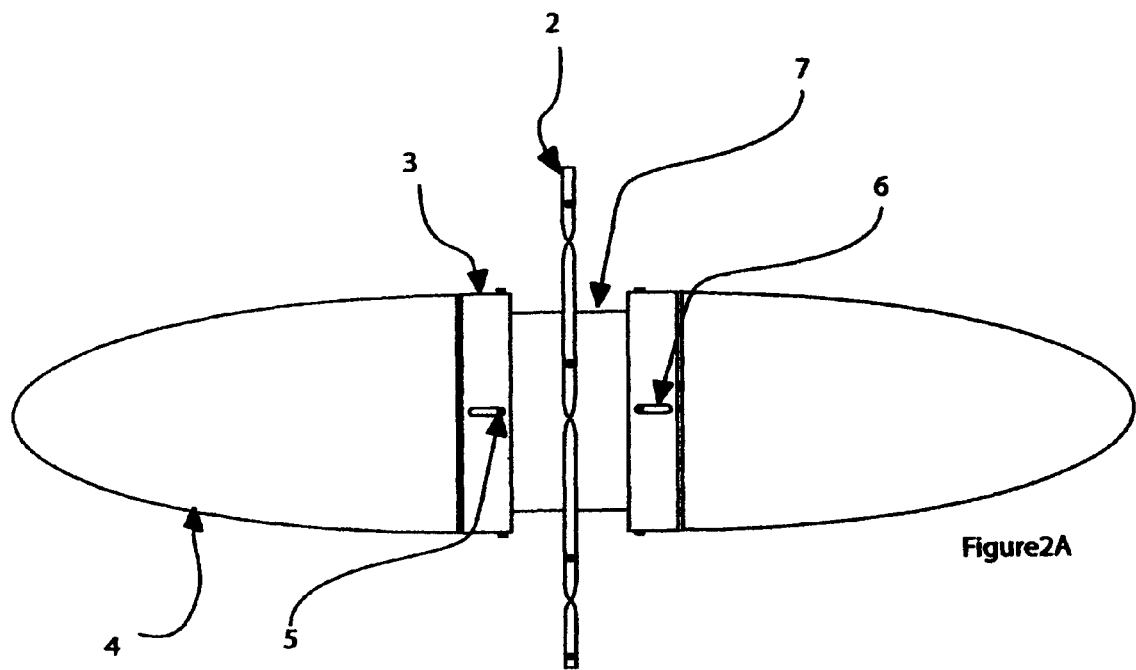
Figure2A
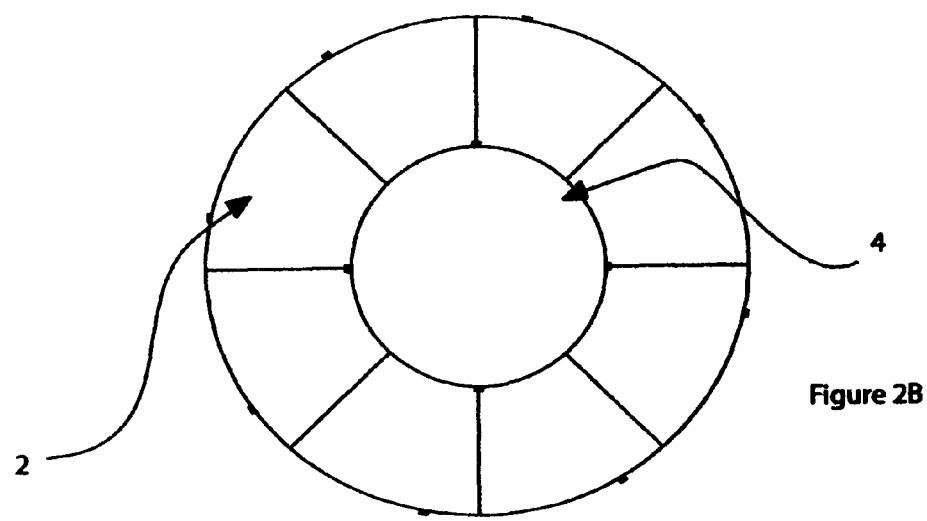
Figure 2B

FIGURE 7
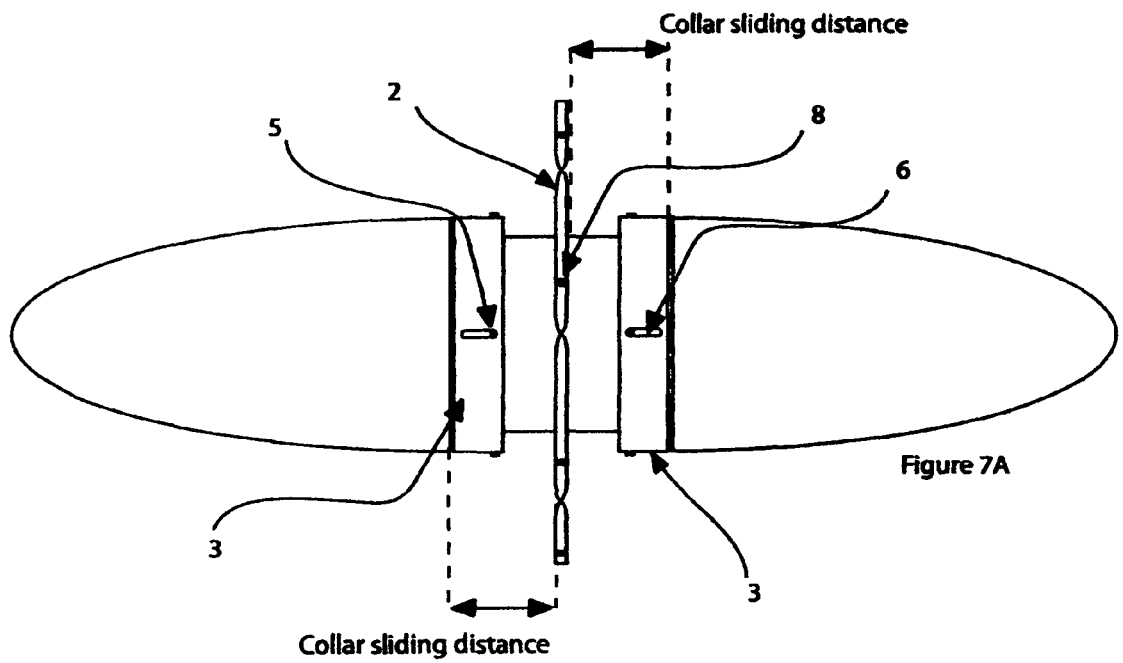
Figure 7A
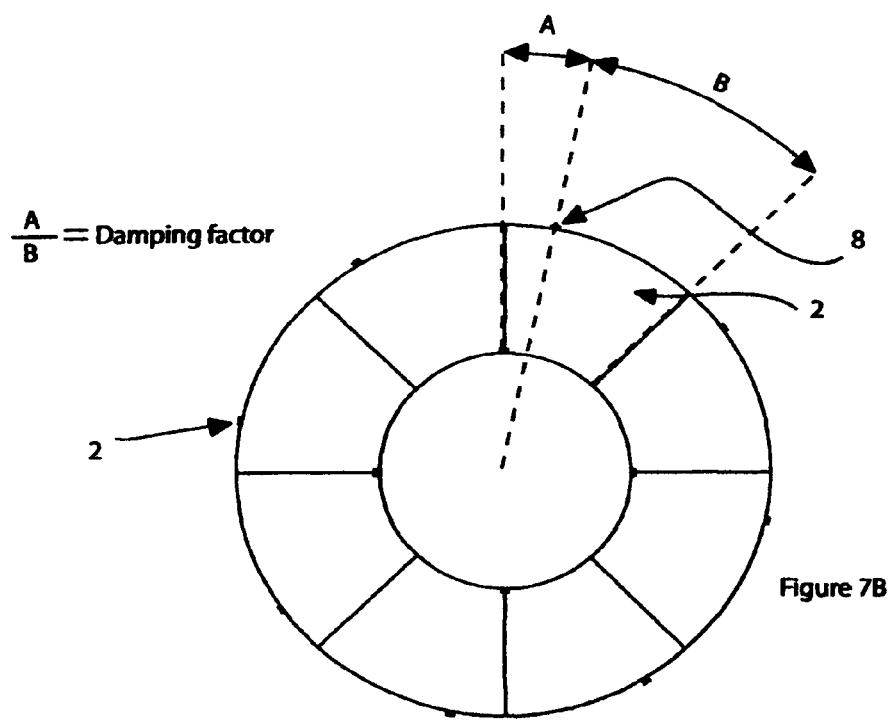
Figure 7B

AUTOMATIC PITCH TURBINE

FIELD OF THE INVENTION

The present invention relates to a turbine and, more particularly, to a bidirectional flow or force turbine, that will turn in one direction with a bidirectional flow or force applied to it.

BACKGROUND OF THE INVENTION

The problem with generating power from sea waves, is that the wave is constantly changing its water level. That is, it is changing from crest to trough. This change will produce a force similar to a piston from any engine. When a pipe is use to capture this force, it will produce a force that constantly changing its direction. That is, it is a bidirectional force. A normal turbine would not be able to work with this, because it would constantly be changing the direction of rotation. It would not be able to produce any useful working power.

Therefore, we need a turbine that will always turn in the same direction, no matter the changes in direction of the air flow. Also we need this turbine to be very efficient in doing this. And to have few moving parts, so it requires very little maintenance.

There have been other solution attempts to this bidirectional force. Just to name a few.

1) One of them, the expensive check valve systems. Which use a regular turbine, but rectify the changing bidirectional force using this check valve system.
2) Also there is the Well's turbine, which will rotate in one direction no matter the directional change of the air flow.
3) And there is the turbine that has variable pitch, a project at island of Pico in the Azores, that can turn in the same direction no matter the change in air flow direction.

The short comings of this solutions are as follows:
1) The check valve system has to many moving parts. Therefore, they tear and wear, and evenly will need much maintenance and interruptions in the service.
2) The Well's☐turbine has a low efficiency because of the high angle of attack and higher drag coefficient.
3) And the turbine that changes its pitch at island of Pico in the Azores, has the same problem as the check valve system, to many moving parts, making it victim to much maintenance and power interruptions. It needs a very complex electronic and mechanical control system to change its pitch.

It is therefore an object of the invention to produce useful power from the bidirectional force of sea waves.

It is another object of the invention to have a turbine that will rotate in one direction with a bidirectional air flow.

It is another object of the invention to have this turbine change the blade pitch automatically in response to the change of a bidirectional air flow.

It is another object of the invention to have maximum pitch of 45 degrees on the blades of this turbine for maximum efficiency.

It is another object of the invention to change its pitch under the influence of any gas or liquid flow.

It is another object of the invention to have a energy source that can produce power 24 hours a day and 7 days a week or 365 days of the year.

It is another object of the invention to be able to produce power in the megawatt range and even higher.

SUMMARY OF THE INVENTION

In accordance with the present invention, there is provided a turbine that will produce useful mechanical force from the dynamic force of the sea wave. This is done by rectifying the bidirectional force obtained from such wave. This turbine will produce a unidirectional rotation from the bidirectional force of the sea wave. Will do this when placed inside the connecting pipe that connects to a pressure chamber which will produce a bidirectional air flow caused by the variation of water level inside this pressure chamber. The turbine will adjust the pitch of its blades automatically as the air flow inside the pipe changes direction. A normal turbine would rotate back and forward and would be useless in producing output power. The air flow will change the pitch of the blade, because the blade is mounted on a shaft, through ball bearings. Because the blade is acting like a flag with its long tail on a pole, the blade also has a long tail and will always change its direction in accord to the direction of the air flow. Since the pitch can change to a maximum pitch of 45 degrees in both directions it will have a high efficiency.

BRIEF DESCRIPTION OF THE DRAWINGS

A complete understanding of the present invention may be obtained by reference to the accompanying drawings, when considered in conjunction with the subsequent, detailed description, in which:

FIG. 2A is a side view of an Automatic Pitch Turbine; FIG. 2B is a front view of an Automatic Pitch Turbine;

FIG. 7A and 7B are detail views of an automatic pitch system and its adjusting points for the turbine;

For purposes of clarity and brevity, like elements and components will bear the same designations and numbering throughout the Figures.

DESCRIPTION OF THE PREFERRED EMBODIMENT

Figure 1:
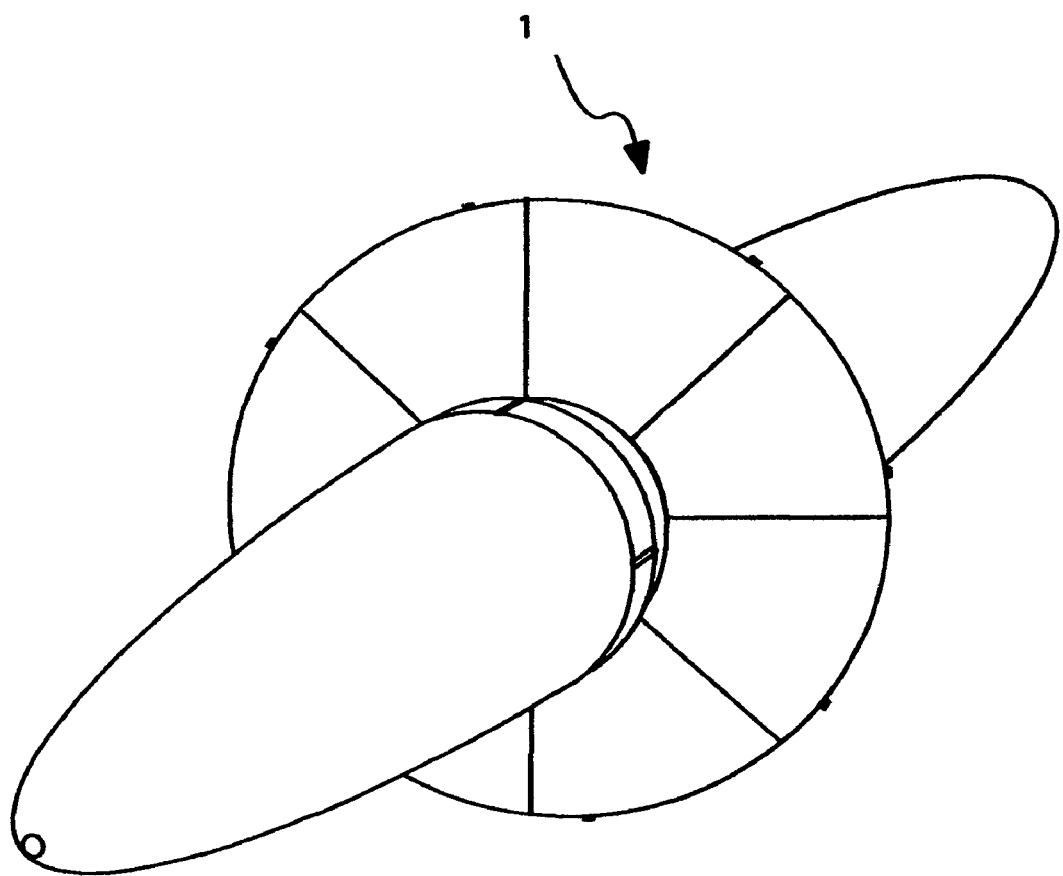
FIG. 1 is a perspective view of an Automatic Pitch Turbine.
Figure 3:
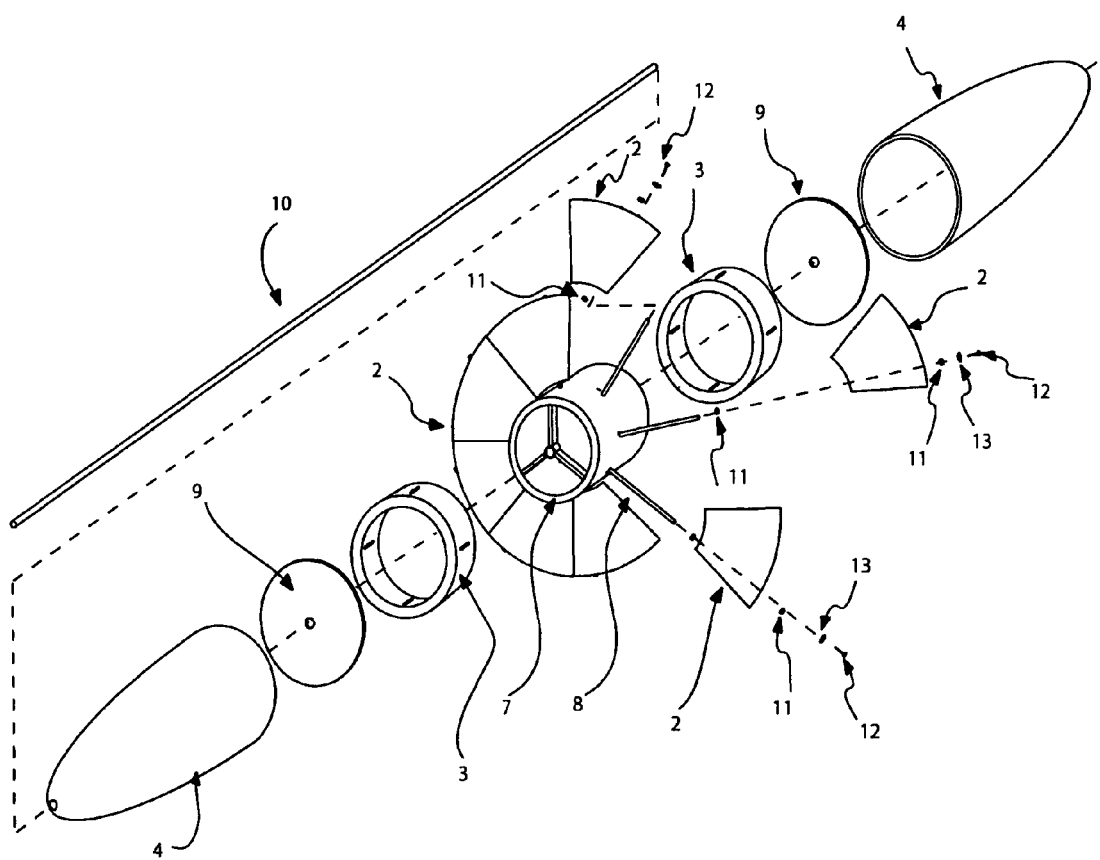
FIG. 3 is an exploded view of an Automatic Pitch Turbine or the bidirectional flow turbine.
Figure 4:
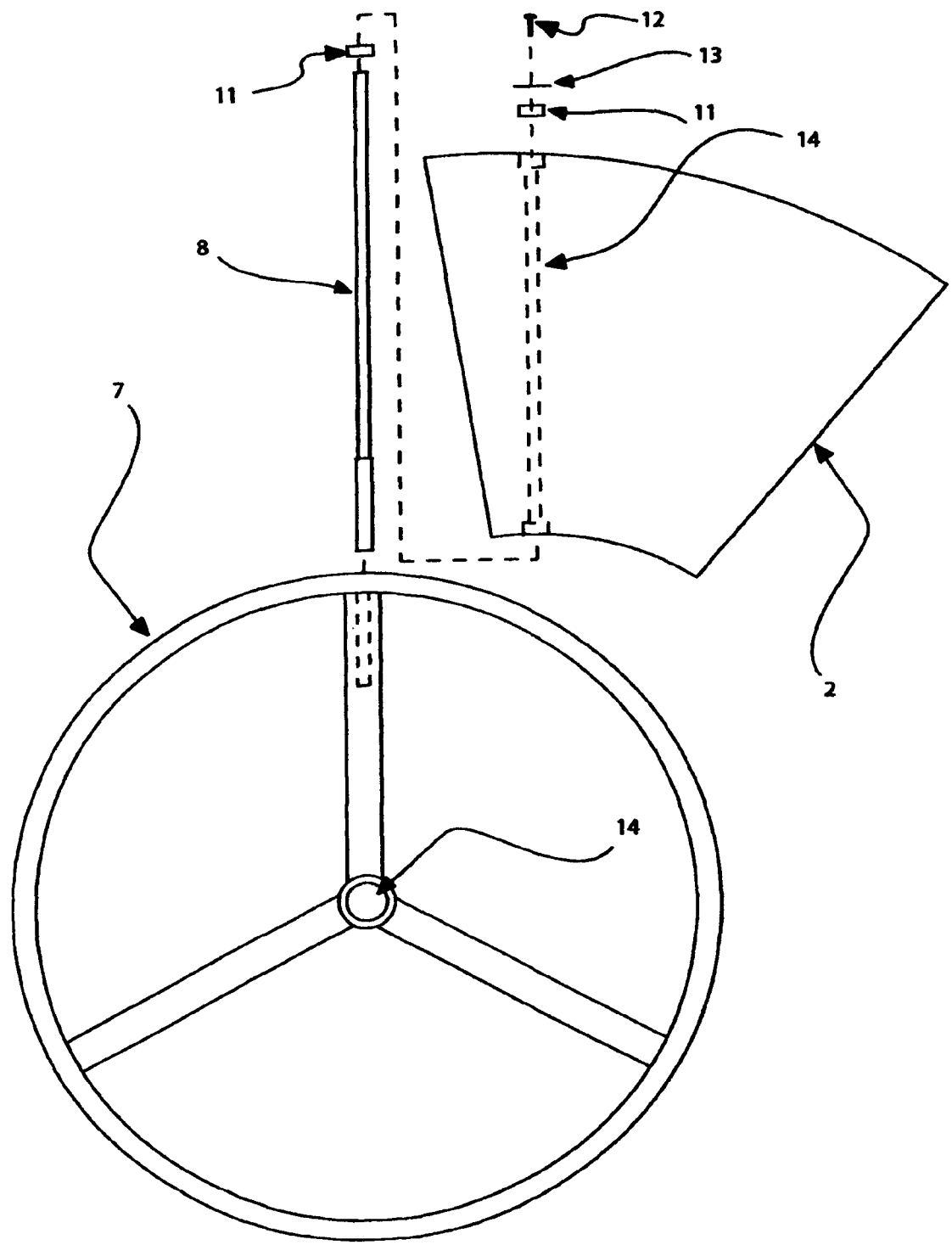
FIG. 4 is a detail view of an automatic blade system, here we see how the blade is mounted on a shaft using two ball bearing, in the blade is seen a hole where the shaft is inserted into the blade.

The Automatic Pitch Turbine 1 seen in FIG. 1 is compose of the following main parts, two pitch adjusting collar 3, two spinner 4, main body 7, blade 2 (or eight blades but could be more or less) which is part of the automatic blade system and main shaft 10, as seen in FIG. 2 and FIG. 3. The plate 9 holds the spinner 4 to the main body 7. The main body 7 holds all the parts together as seen on FIG. 3. In FIG. 4 is seen the parts that compose the automatic pitch system, as fallows, the blade 2, blade shaft 8, two ball bearing 11, one washer 13 and one holding screw 12 that hold all this parts together. Blade hole 14 is where the blade shaft 8 will be inserted into the blade with two ball bearing 11 one on top and one at the bottom. On the blade shaft 8 is where the blade will rotate to change pitch angle.

Figure 5:
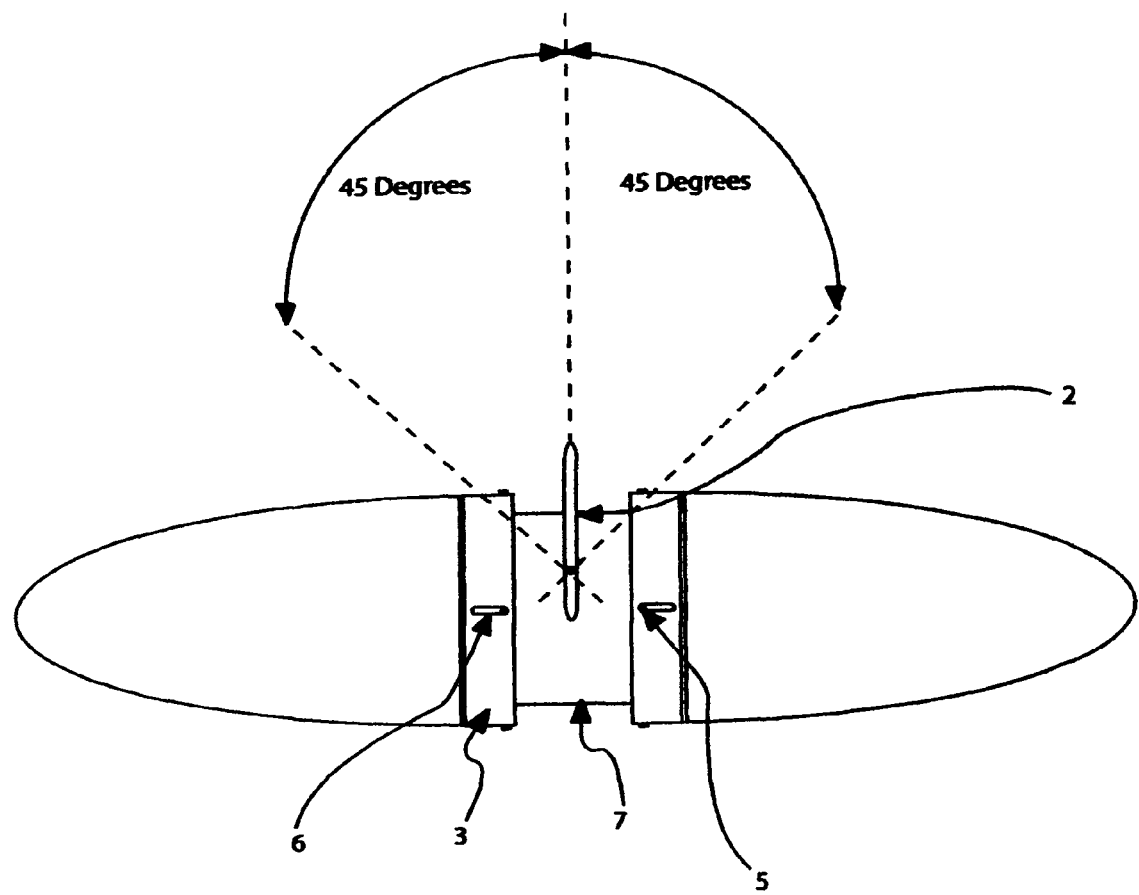
FIG. 5 is a left detail view of an automatic blade system and how much variation in degrees its pitch will have.
Figure 6:
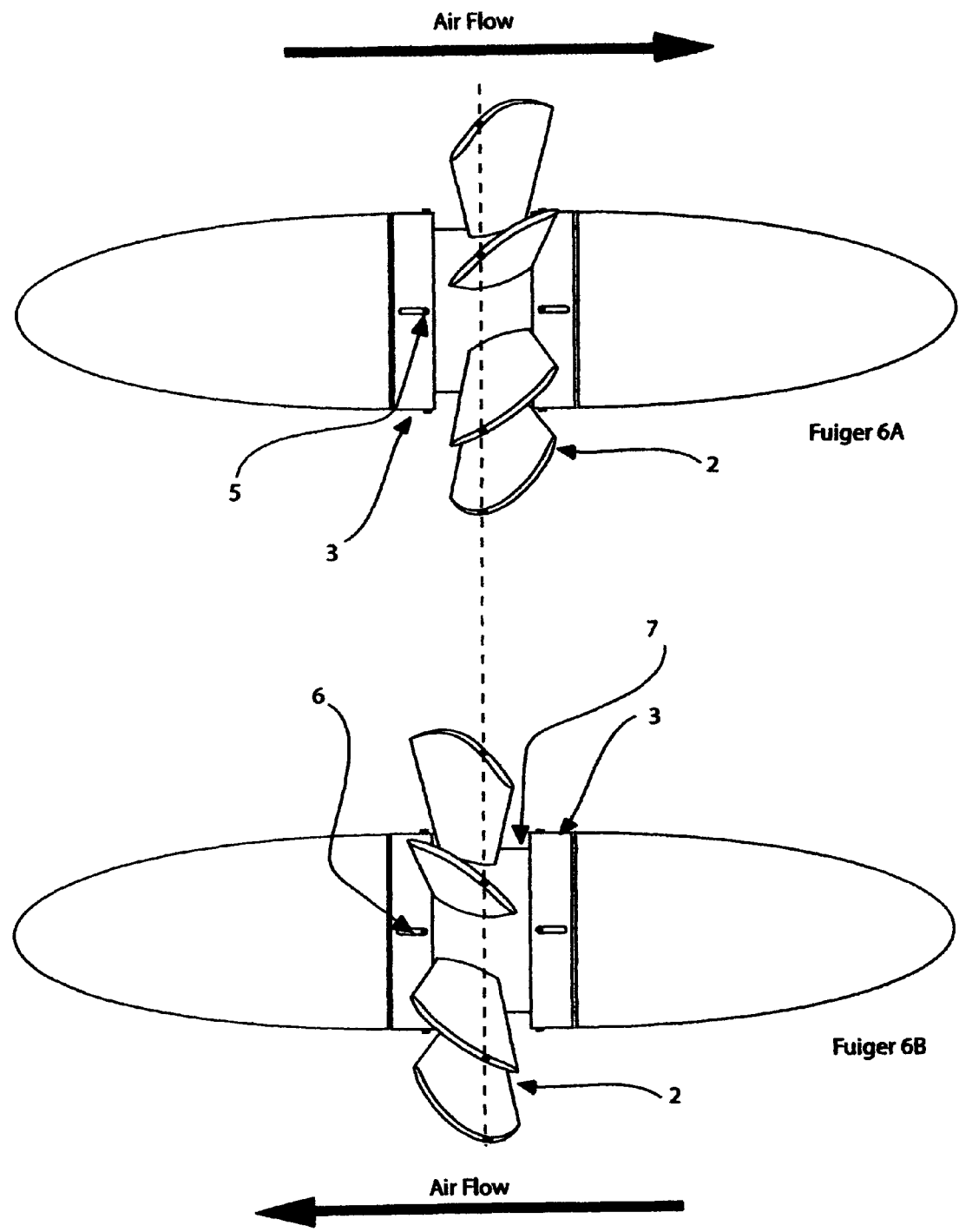
FIG. 6A and 6B are left detail views of an automatic pitch control system for this turbine, here is seen how the pitch of all the blades varies with the bidirectional flow of air.

The turbine will maintain a unidirectional rotation with a bidirectional flow of gas or liquid. This is done by changing the blade pitch. The air flow is the one that changes the pitch on the blades. This happens because the blade acts like a flag on a pole. FIG. 7B of FIG. 7 shows how length B is greater than length A and will make the blade act like a flag. In FIG. 6 is seen how all the blades change direction under the influence of the air flow. Also by changing the ratio A/B the blades can be made to change pitch smoother or faster. The higher this ratio the more damping effect it will have on the speed with which the blade change its pitch as seen in FIG. 7B of FIG. 7. The pitch adjusting collar 3 can be adjusted by sliding the collar along the slot 6 and tighten the adjusting screw 5 and in this way change the maximum pitch angle from 0 degrees to a maximum of 45 degrees that the blade can reach. In other words the pitch adjusting collar 3 is for limiting the maximum angle that the blade will travel. As seen in FIG. 5 (FIG. 5 shows only one blade although the turbine has eight blades) and FIG. 7A of FIG. 7

Figure 8:
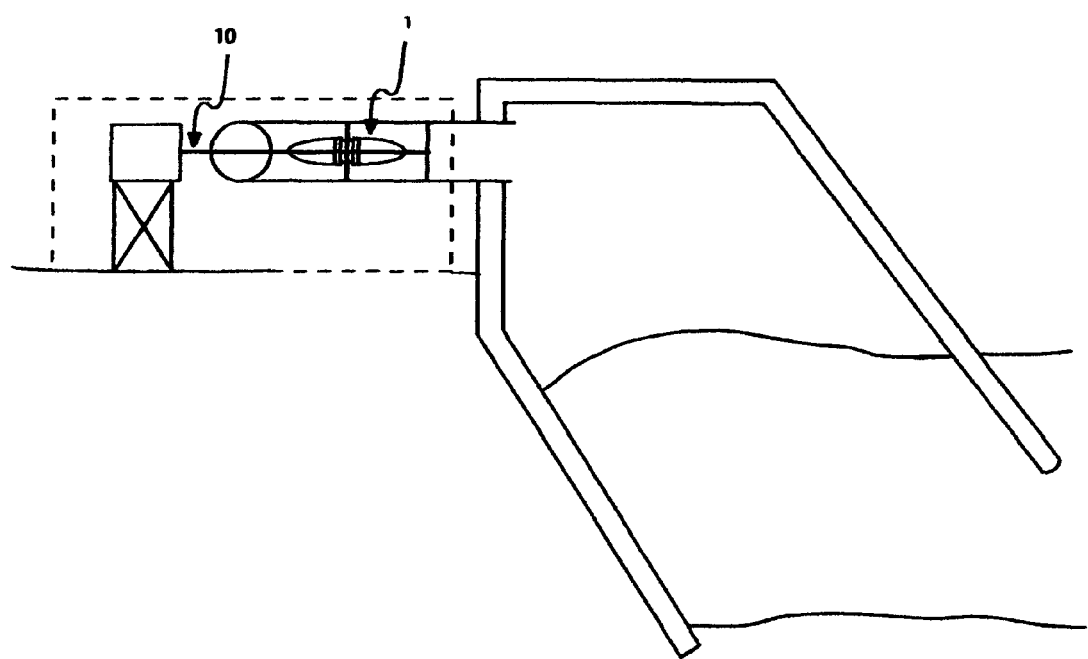
FIG. 8 is a left detail view of an application or one of the possible application given to the turbine, here it is seen extracting power from the sea waves.
Figure 9:
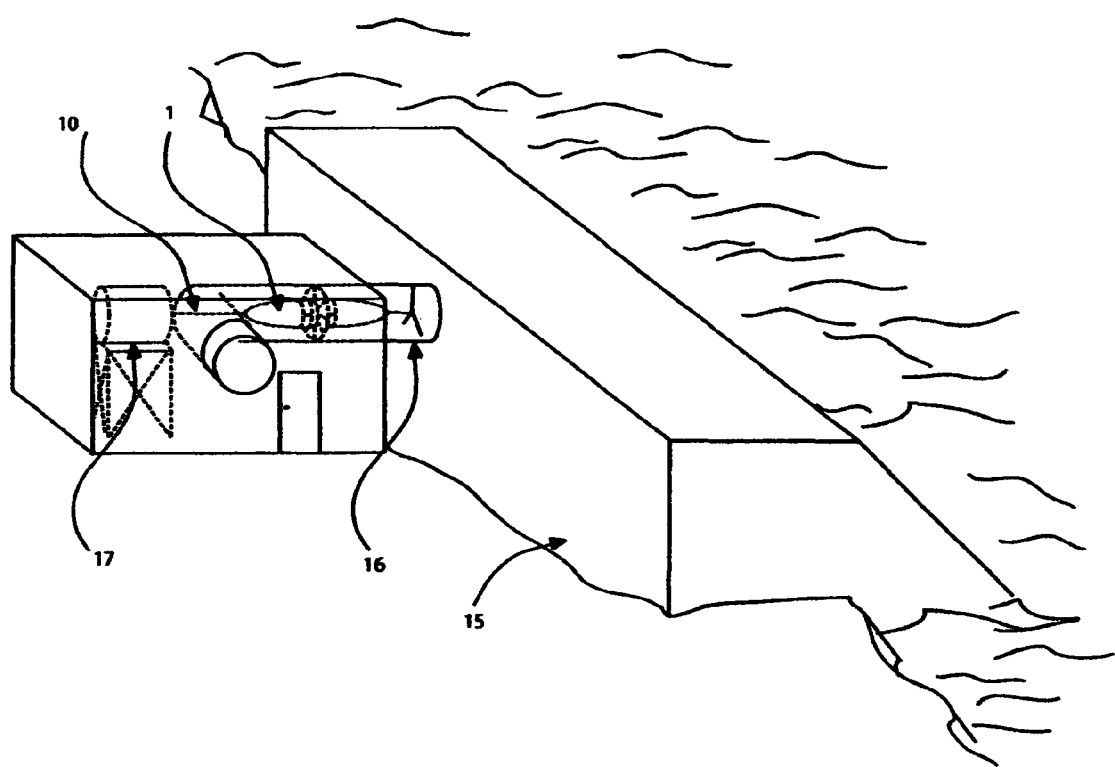
FIG. 9 is a left perspective view of an application of the turbine been used to extract power from sea waves, using an electrical generator.

One of the uses this turbine can be put to do, is extracting energy from sea waves as seen on FIG. 8 and FIG. 9. Here we see it embedded in a connecting pipe 16 that is connected to a pressure chamber 15. When the wave level rises it will produce a pressure in the pressure chamber 15 and will cause an air flow into the turbine that will adjust the pitch in the turbine and will cause it to rotate. When the wave level go's low it will cause a low pressure in the pressure chamber 15. This will cause an air flow in the inverse direction in the turbine and will cause the turbine to adjust its pitch in the correct direction and will turn the turbine in the same direction as before. The turbine is connected to an electrical generator 17 by the main shaft 10 and there for will extract this energy from the sea wave.

At the output of this turbine there can be added a flywheel or transmission or both to maintain a constant speed.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An automatic pitch turbine for converting the dynamic force of sea wave, gaseous flow or any liquid flow to useful power, by rectifying the bidirectional force of sea wave, gaseous flow or any liquid flow in an automatic manner, that is by automatically adjusting the pitch of turbine blades using the gas or liquid flow, comprising:

a main body;

at least one or more blades mounted to the main body, for rectifying the bidirectional force by changing a pitch of the blade;

a spinner, for opening the flow and concentrating the flow on the blades;

a pitch adjusting collar mounted to the main body, for adjusting or limiting the pitch of the blade to a maximum angle;

a slot formed on the pitch adjusting collar, for sliding the pitch adjusting collar along the slot;

an adjusting screw inserted in the slot, for holding or adjusting the pitch adjusting collar in the right position;

a blade shaft mounted to the main body, for holding the blade in place to the main body, also here is where the pitch of the blade is automatically adjusted and the blade rotates on the blade shaft to the correct pitch;

a plate, for holding the spinner to the main body;

a main shaft, for holding the turbine to an inside of a connecting pipe and to connect it to a generator or load, also here is where the turbine will rotate;

two ball bearings, for connecting the blade shaft to the blade and where the blade will rotate;

a blade hole, for holding the blade to the blade shaft through the two ball bearings, wherein the blade shaft will run through the blade hole;

a washer, for holding a top ball bearing of the two ball bearings and the blade in place; and a holding screw, for holding the washer and the top ball bearing together.

* * * * *